(12) United States Patent
Miyazaki et al.

(10) Patent No.: US 7,304,581 B2
(45) Date of Patent: Dec. 4, 2007

(54) MOBILE INFORMATION APPARATUS AND MOVING METHOD THEREFOR, AND INFORMATION SYSTEM AND POSITION ESTIMATION METHOD

(75) Inventors: Tomotaka Miyazaki, Kawasaki (JP); Masafumi Tamura, Chofu (JP); Shunichi Kawabata, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 270 days.

(21) Appl. No.: 11/213,975

(22) Filed: Aug. 30, 2005

(65) Prior Publication Data

US 2006/0045060 A1 Mar. 2, 2006

(30) Foreign Application Priority Data

Aug. 31, 2004 (JP) ............... 2004-252711

(51) Int. Cl.
*G08B 23/00* (2006.01)
*B25J 9/18* (2006.01)
*G05B 19/19* (2006.01)

(52) U.S. Cl. ............... 340/573.1; 318/568.11; 318/568.12; 700/245; 901/1

(58) Field of Classification Search ............ 340/573.1, 340/3.1, 310.16; 318/568.11, 568.12, 568.25; 700/245, 250, 253; 455/405; 901/1
See application file for complete search history.

(56) References Cited

U.S. PATENT DOCUMENTS

| | | | | |
|---|---|---|---|---|
| 5,416,906 A | * | 5/1995 | Mariani | 340/3.1 |
| 6,542,788 B2 | * | 4/2003 | Hosonuma et al. | 700/245 |
| 6,658,325 B2 | * | 12/2003 | Zweig | 700/250 |
| 6,879,878 B2 | * | 4/2005 | Glenn et al. | 700/245 |
| 7,076,334 B2 | * | 7/2006 | Sabe et al. | 700/245 |
| 7,120,519 B2 | * | 10/2006 | Okabayashi et al. | 318/568.11 |
| 7,164,970 B2 | * | 1/2007 | Wang et al. | 318/568.11 |
| 7,166,977 B2 | * | 1/2007 | Takayama et al. | 318/568.11 |

FOREIGN PATENT DOCUMENTS

| | | |
|---|---|---|
| JP | 2001-16659 | 1/2001 |
| JP | 2002-92767 | 3/2002 |
| JP | 2002-199470 | 7/2002 |

\* cited by examiner

*Primary Examiner*—John Tweel, Jr.
(74) *Attorney, Agent, or Firm*—Finnegan, Henderson, Farabow, Garrett & Dunner, L.L.P.

(57) ABSTRACT

A mobile information apparatus has a communication unit configured to collect usage states of a plurality of devices on a network, an estimation unit configured to estimate a position of a user on the basis of the usage states of the plurality of devices collected by the communication unit, and a moving unit configured to move a housing of the mobile information apparatus in accordance with the position of the user estimated by the estimation unit.

20 Claims, 8 Drawing Sheets

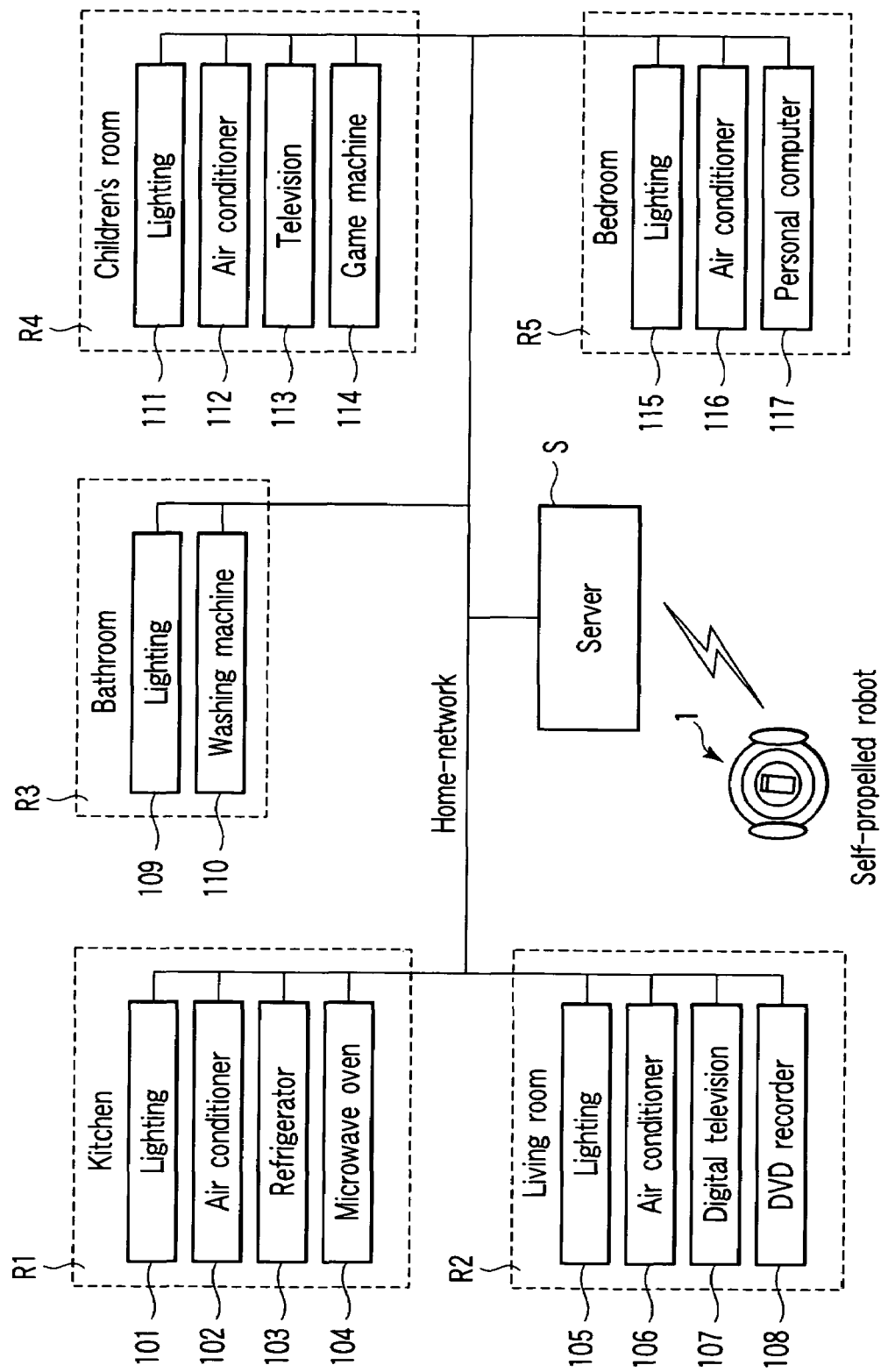
F I G. 1

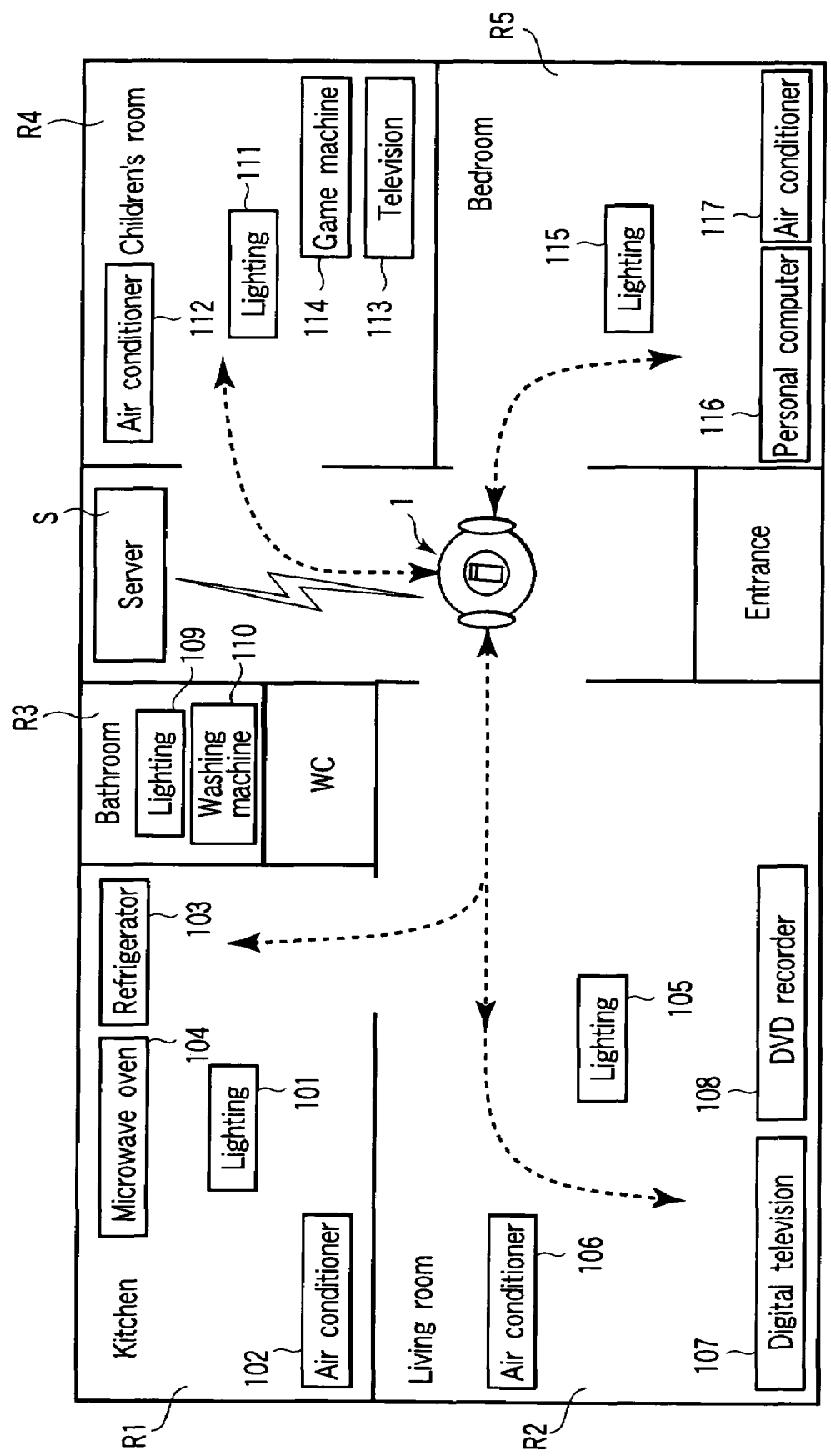
F I G. 2

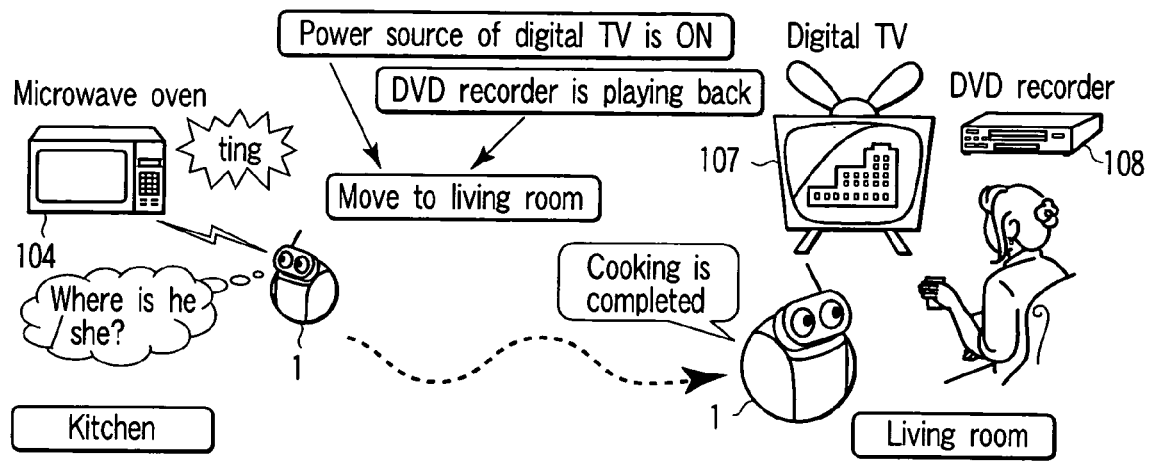
F I G. 6
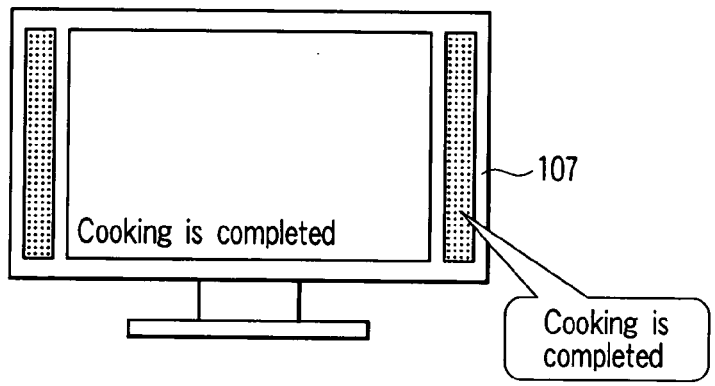
F I G. 7
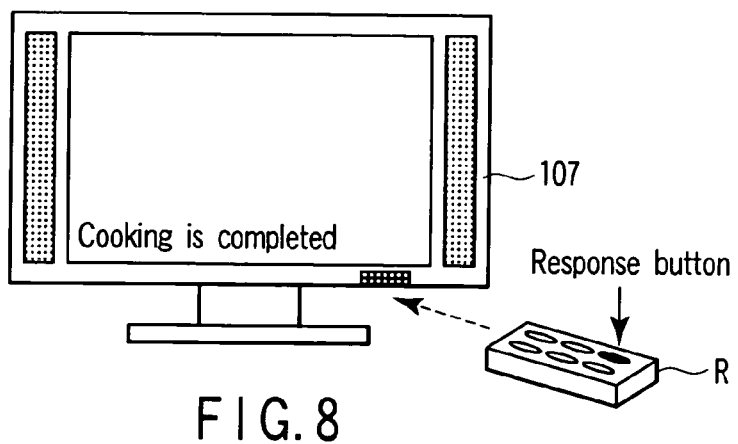
F I G. 8

MOBILE INFORMATION APPARATUS AND MOVING METHOD THEREFOR, AND INFORMATION SYSTEM AND POSITION ESTIMATION METHOD

CROSS-REFERENCE TO RELATED APPLICATIONS

This application is based upon and claims the benefit of priority from prior Japanese Patent Application No. 2004-252711, filed Aug. 31, 2004, the entire contents of which are incorporated herein by reference.

BACKGROUND OF THE INVENTION

1. Field of the Invention

The present invention relates to a mobile information apparatus, and in particular, to a mobile information apparatus which estimates a position of a user on the basis of a usage state of a device on a network, and a moving method therefor, an information system and a position estimation method.

2. Description of the Related Art

Recently, many digital devices have been manufactured and have come into wide use, and automating at home utilizing a network in association with such digital devices has been developed. With respect to such automating at home, for example, an automation system which acquires information on whether or not a user is in a room, and applies appropriate processing onto the information has been known.

In Patent Document 1 (Jpn. Pat. Appln. KOKAI Publication No. 2001-16659), there is disclosed an automation system which detects that a person is not in a house, and automatically suppresses the consumption of standby current of unnecessary devices in rooms. In accordance therewith, an appropriate home-automation is realized without any special operation by a user.

However, in a prior art in Patent Document 1, although the user presence is detected, there is the problem that, for example, when desired information is provided to the user by using a robot type mobile information apparatus, a concrete method therefor has not been disclosed.

BRIEF SUMMARY OF THE INVENTION

One of the embodiments is a mobile information apparatus comprising: a communication unit configured to collect usage states of a plurality of devices on a network; an estimation unit configured to estimate a position of a user on the basis of the usage states of the plurality of devices collected by the communication unit; and a moving unit configured to move a housing of the mobile information apparatus in accordance with the position of the user estimated by the estimation unit.

BRIEF DESCRIPTION OF THE SEVERAL VIEWS OF THE DRAWING

FIG. 1 is a system diagram showing one example of an information system according to an embodiment of the present invention;

FIG. 2 is a sketch showing one example of a room of the information system according to the embodiment of the invention;

FIG. 6 is an explanatory diagram for explaining one example of user position estimation processing of the mobile information apparatus according to the embodiment of the invention;

FIG. 7 is an explanatory diagram showing one example of information presentation by using a television on a network by a mobile information apparatus according to an embodiment of the invention;

FIG. 8 is an explanatory diagram showing another example of information presentation by using the television on the network by the mobile information apparatus according to the embodiment of the invention;

DETAILED DESCRIPTION OF THE INVENTION

Hereinafter, embodiments of the invention will be described in detail with reference to the drawings.

Figure 3:
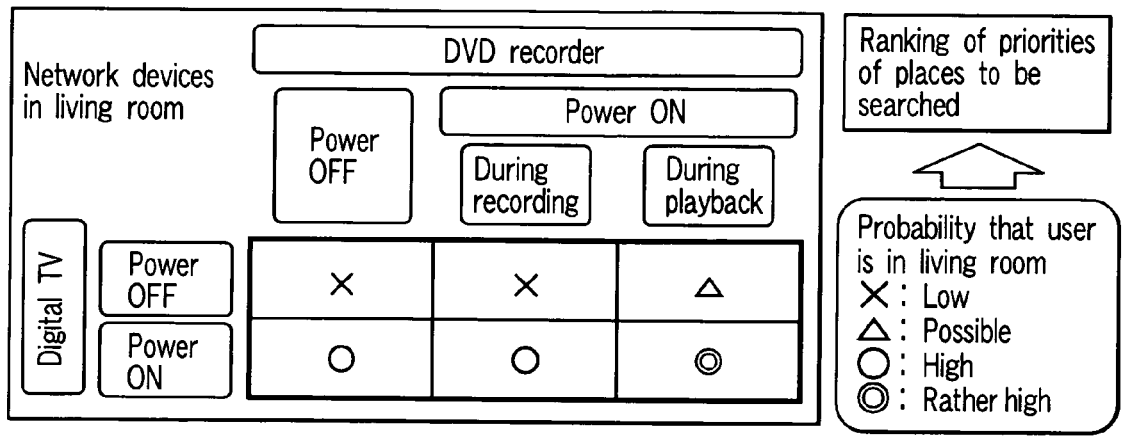
FIG. 3 is an explanatory diagram showing one example of indoor user position estimation processing by the information system according to the embodiment of the invention.

First Embodiment: Configuration of Information System according to the Invention A first embodiment specifies a case in which user position estimation processing according to the invention is carried out at a server of an information system. A configuration of the information system according to the invention will be described with reference to the drawings. FIG. 1 is a system diagram showing one example of the information system according to an embodiment of the invention, FIG. 2 is a sketch showing one example of rooms of the information system, and FIG. 3 is an explanatory diagram showing one example of indoor user position estimation processing by the information system.

In the information system according to the invention, as shown in FIGS. 1 and 2, a mobile information apparatus 1 which is a self-propelled robot, a server S which can communicate with the mobile information apparatus, and network devices 101 to 117 at the respective rooms are shown. Namely, a lighting 101, a air conditioner 102, a refrigerator 103, and an microwave oven 104 in a kitchen R1; a lighting 105, an air conditioner 106, a digital television 107, and a DVD recorder 108 in a living room R2; a lighting 109 and a washing machine 110 in a bathroom R3; a lighting 111, an air conditioner 112, a television 113, and a game machine 114 in a children's room R4; and a lighting 115, an air conditioner 116, and a personal computer 117 in a bedroom R5 are respectively shown via a network. Here, the network is a wireless (or wire) network such as, for example, Bluetooth, LAN or IEEE 1394, but not limited thereto.

The server S stores only information on which position in which room the respective network devices 101 to 117 are positioned at in advance. The network devices 101 to 117 automatically start to communicate with the server S when the power sources are turned on, and transmit the state information of the devices. For example, in a case of the air conditioner 102 or the like, information such as a cooler or a heater, set temperature, wind power, wind direction and room temperature are transmitted to the server S. In a case of the DVD recorder 108, information such as during recording or playback, remaining recording time and a program genre are transmitted. The server S can grasp the operating situations of the devices in the house by receiving the state information from the network devices 101 to 117.

Next, explanation will be given for a technique of estimating a position at which a user indoors is at a control unit (not shown) of the server S of the information system according to the invention (or it is possible to estimate it in the control unit of the self-propelled robot 1) by using the explanatory diagram of FIG. 3. As one example, consideration will be made for the case in which the digital television 107 and the DVD recorder 108 are disposed as network devices in the living room R2. The server S receives power ON/OFF state signals from the digital television 107, and receives the state signals of power ON/OFF and during recording/playback from the DVD recorder. When the power source of the digital television is off, and the power source of the DVD recorder 108 as well is off, there is a low probability that a user is in the living room R2, and marks × are indicated in the table. When the power source of the digital TV is on, and the power source of the DVD recorder is off, there is a high probability that the user is in the living room, and marks ○ are indicated in the table. When the power of the digital TV is on, and the DVD recorder 108 is playing back, there is a rather high probability that the user is in the living room R2, a mark ⊚ is indicated in the table.

As described above, in the control unit (not shown) of the server S of the information system (or it is possible to carry it out in the control unit of the self-propelled robot 1), the probability that the user is in the living room is estimated by combining the operating states of the digital television 107 and the DVD recorder 108. If the air conditioner 106 in the living room is on, the probability is made even higher. The more the devices for use in an estimation are, the higher the reliability of the estimated result is. At night, the fact that the lighting 105 in the room is on is effective information for estimation. It is possible to estimate which room the user is in by the technique described above.

Next, a technique of specifying a position of the user will be described hereinafter. When the user uses a television or a personal computer, the user uses it so as to be positioned within a given range with respect to a position of the device. In a case of a television, the user may view the television so as to sit down on a sofa in front of the television, and in a case of a personal computer, the user may put the personal computer on a desk, and use it so as to take a chair. The positional information (map data) on where in the rooms the network devices are disposed at is stored in the server S, whereby even a detailed position of the user in a room can be estimated. In a case of a device such as an air conditioner which functions with respect to an entire room, it is difficult to specify a position of the user on the basis of the positional information of the device. However, it is possible to estimate a position of the user on the basis of information on that a wind direction of the air conditioner is going to a given specific direction, and the like.

This embodiment has a mechanism that a function of estimating a user position is incorporated in the server S. However, the function can be installed in a terminal which is an access point of home electric appliances on home-network which have been conventionally used, or in the control unit of the self-propelled robot 1, and such an embodiment may be included in the invention.

Second Embodiment: Mobile Information Apparatus According to the Invention

Figure 4:
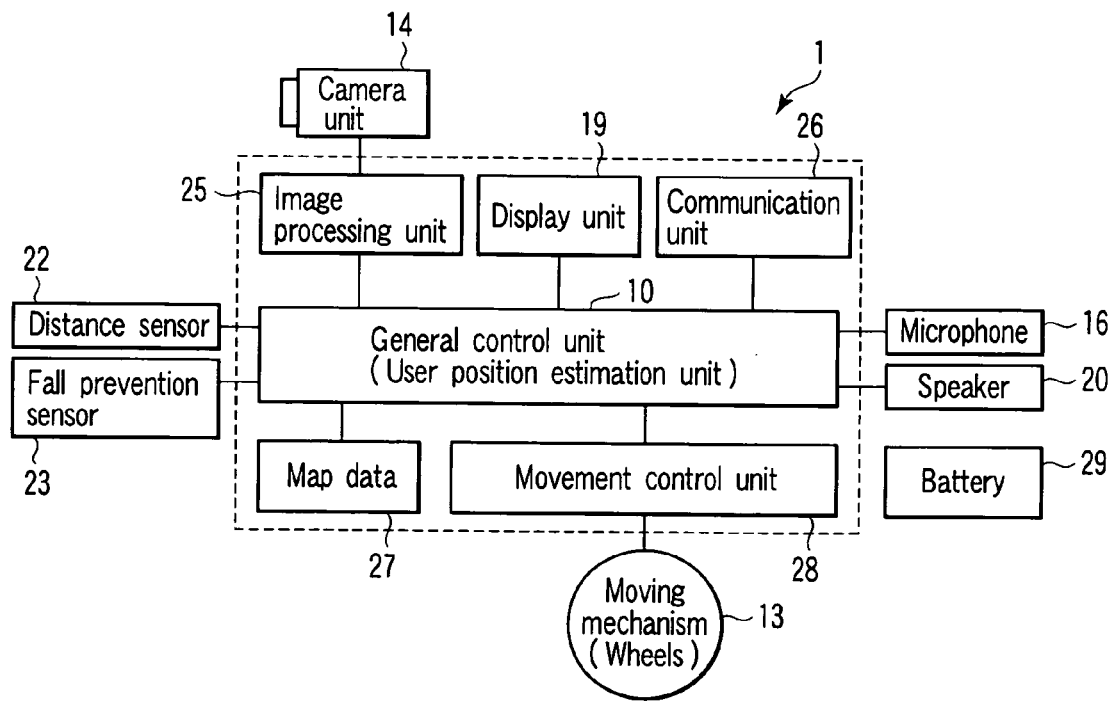
FIG. 4 is a block diagram showing one example of a configuration of a mobile information apparatus according to an embodiment of the invention.

A second embodiment specifies a case in which user position estimation processing according to the invention is carried out at a mobile information apparatus which is a self-propelled robot. FIG. 4 is a block diagram showing one example of a configuration of a mobile information apparatus according to an embodiment of the invention, FIG. 5 is an external view showing one example of an appearance of the mobile information apparatus, FIG. 6 is an explanatory diagram for explaining one example of the user position estimation processing of the mobile information apparatus, FIG. 11 is an external view showing one example of the appearance of the mobile information apparatus, and FIG. 12 is a flowchart showing one example of the user position estimation processing of the mobile information apparatus.

Figure 5:
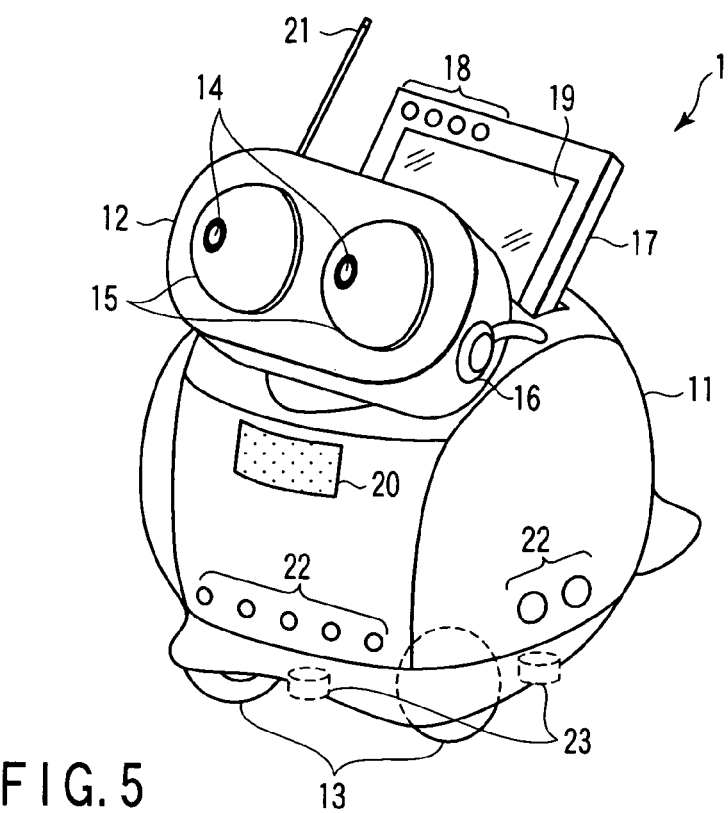
FIG. 5 is an external view showing one example of an appearance of the mobile information apparatus according to the embodiment of the invention.
Figure 11:
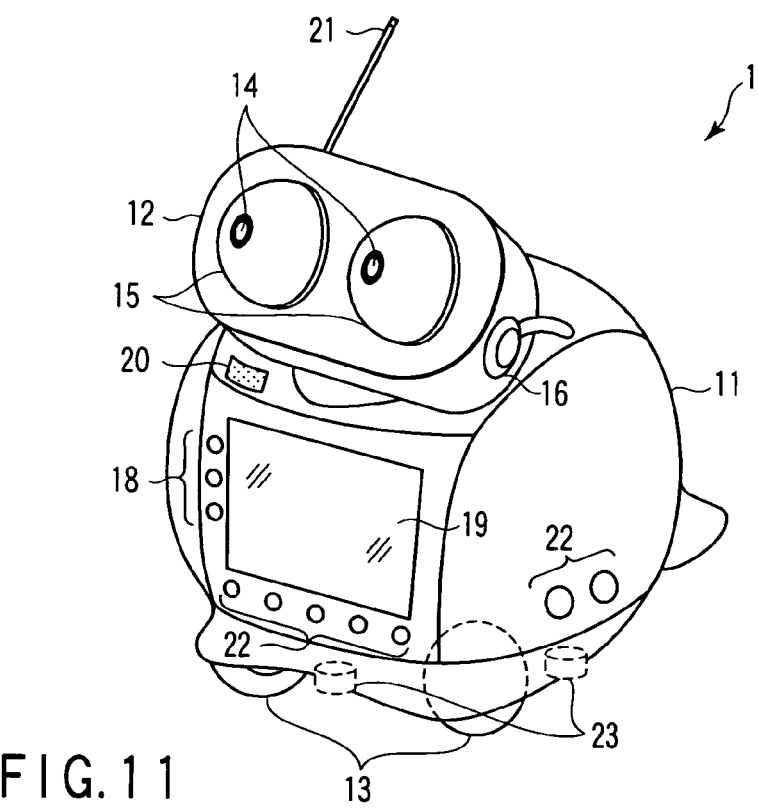
FIG. 11 is an external view showing one example of the appearance of the mobile information apparatus according to the embodiment of the invention.
Figure 12:
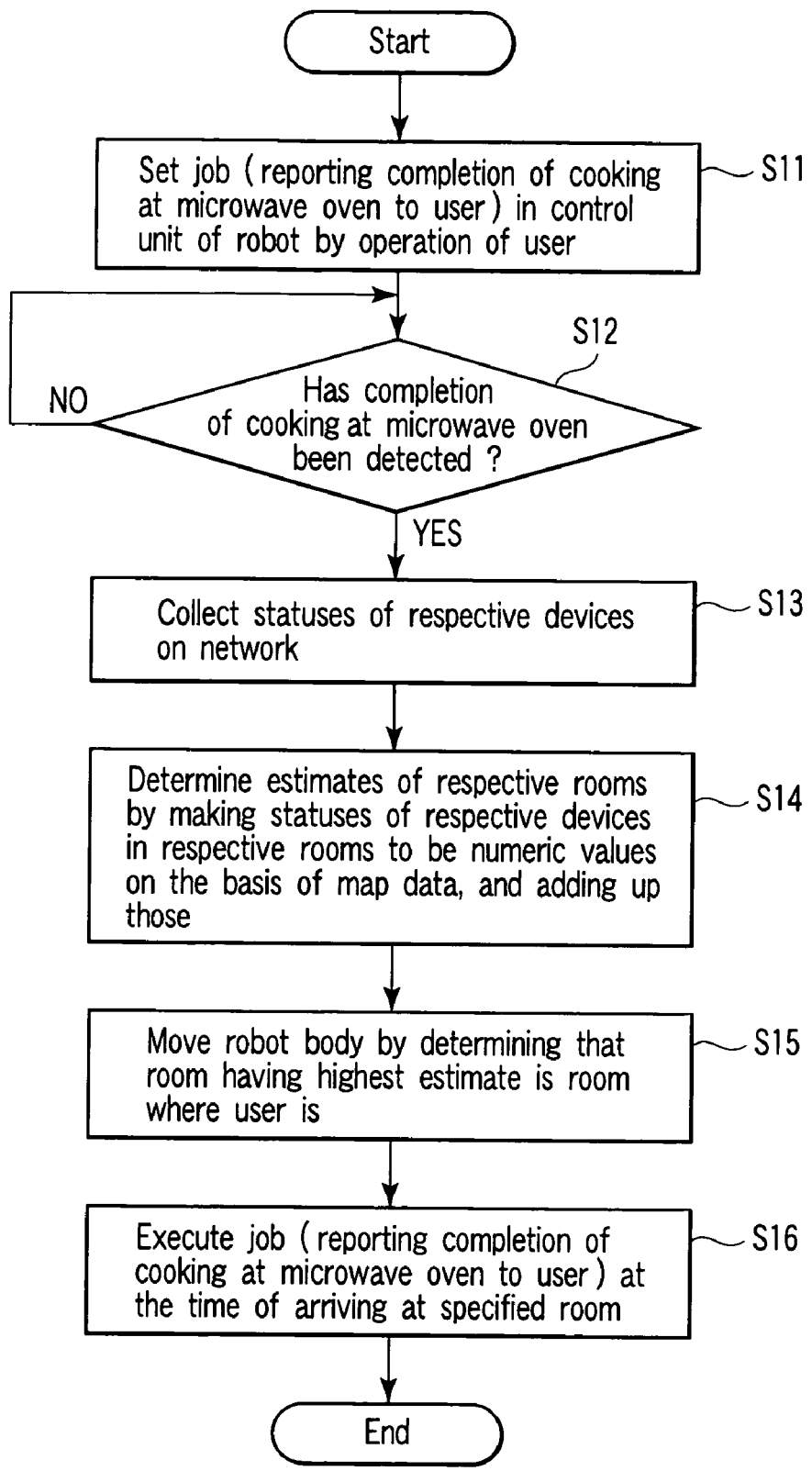
FIG. 12 is a flowchart showing one example of user position estimation processing of the mobile information apparatus according to the embodiment of the invention.

First, the mobile information apparatus 1 according to the invention, as shown in FIGS. 4, 5 and 11, comprises: a head unit 12; a camera unit 14 which picks up a peripheral situation as an image; a camera support unit 15; an image processing unit 25 which processes the picked-up image; a display unit 19 which displays images and messages; a communication unit 26 which makes communication with an external device; a microphone 16 which collects ambient sounds and voices; a display unit 17 which displays messages and the like; an operational button group 18; a display (Liquid Crystal Display) 19; a speaker 20 which outputs messages and the like; a communication antenna 21; a distance sensor group 22; a fall prevention sensor group 23; a movement control unit 28 and a movement mechanism 13 which can autonomously move on the basis of map data; and a general control unit 10 which manages the control of the entire robot. The mobile information apparatus (robot) 1 makes communication with the server S via a wireless network, and is enabled to search the user in accordance with positional information of a user estimated at the server S or at the general control unit 10.

As shown in FIG. 6, the robot 1 is to search a user by estimating a user position. Namely, as shown in the flowchart of FIG. 12, the user sets in advance the robot so as to report to the user when cooking in the microwave oven in the kitchen is completed (S11). Although the user moves to the living room, the robot 1 continues to move by the autonomic function in order to carry out other works such as a patrol indoors. When the cooking in the microwave oven is completed, the robot 1 receives a signal denoting a cooking completion via the network (S12). The control unit (not shown) of the server S or the control unit 10 of the robot 1 collects the statuses (usage states) of the devices on the network, such as a status in which the power source of the digital television 107 in the living room R2 is on, and a status while the DVD recorder 108 is playing back (S13). Then, on the basis of the map data, the statuses (usage states) of the respective devices in the respective rooms are made to be numeric values and added up, and estimates of the respective rooms are determined (S14). Namely, as an estimation function in the control unit, the map data denoting that a plurality of devices are provided each of the rooms is set by the user, the possibilities of user presence are made to be numeric values on the basis of the usage states of the plurality of devices which have been collected by the communication unit, and in accordance with the numeric values, a possibility of user presence is made to be a numeric value for each of the rooms by using the map data.

At that time, it is preferable that a plurality of room information serving as the map data, device information corresponding to the room information, and evaluation information serving as the numeric values denoting the possibilities of user presence in accordance with the usage states of the respective device information are stored, and in accordance with those information, a possibility of user presence is made to be a numeric value at each room.

Then, a room having the highest estimate is estimated as a room where the user is, and the robot 1 is instructed to move to the living room (S15). This may be instructed from the server S, or the control unit 10 in the robot 1 may instruct the movement control unit 28. The robot 1 receives the instruction, and moves to the living room R2. Thereafter, the robot 1 recognizes the user through a camera image from the camera unit 14, and moves to the vicinity of the user. When the movement is completed, the robot 1 reports to the user that the cooking has been completed through the speaker 20 or the like by a speech, or by displaying that on the display unit 19 (S16).

As described above, the position estimation processing may be carried out by the control unit (not shown) of the server S, and can be carried out in the same way at the control unit 10 in the robot 1. Note that, in the same way as the contents described in the first embodiment, it is preferable to instruct the robot 1, not only to move to a room where the user is, but also to move to a detailed position in the room in accordance with a position of each device.

Moreover, a face authentication function by a camera image is installed in the robot 1, and the robot 1 can determine whether or not a user who is in the living room R2 is the same as a user who has instructed the robot 1 to report the cooking completion. If the user who is in the living room is the same as the user who has instructed, the robot 1 reports to the user that the cooking has been completed. However, when both are not the same, it is preferable that the robot 1 inquires of the server a room where the user seems to be in, and the robot 1 starts to move to another room in accordance with an instruction based on a new estimated result from the server. In this way, the robot 1 has a function for exactly presenting information to the user.

Third Embodiment: Information Presentation via Device

A third embodiment specifies a case in which desired information is presented to a user via a device provided at a position of a user estimated by the user position estimation function in the mobile information apparatus. Namely, in the second embodiment, the description has been given for the case in which information is presented to the user by the self-propelled robot 1. However, here, a method for displaying a message on a television or a personal computer via a network, and a method for reporting to the user information by a sound or a voice from a device having the speaker 20 such as a television or a personal computer will be shown.

FIGS. 7 and 8 are explanatory diagrams showing one example of information presentation by using a television on a network by a mobile information apparatus according to an embodiment of the invention. When the control unit (not shown) of the server S or the control unit 10 of the robot 1 receives a signal of the cooking completion at the microwave oven 104 via the network or the communication unit 26, the control unit instructs the television to display a message on the basis of the result that the user has been estimated to be viewing the television in the living room R2. As shown in FIG. 7, the television which has received the instruction displays a message of "Cooking is completed". At that time, it is preferable that "Cooking is completed" is uttered as a speech from the speaker 20. It is preferable that, in addition to a television, the message is reported by switching the lamp on and off by a device with a lamp, or is reported by a sound from a device with a buzzer or the like as well.

Note that, when a place where the user is in cannot be specified because the power sources of televisions at a plurality of rooms are on, it is preferable that the control unit (not shown) of the server S or the control unit 10 of the robot 1 exactly transmits the information to the user by instructing all the televisions on the network to display messages.

Fourth Embodiment: User Confirmation Signal

Figure 13:
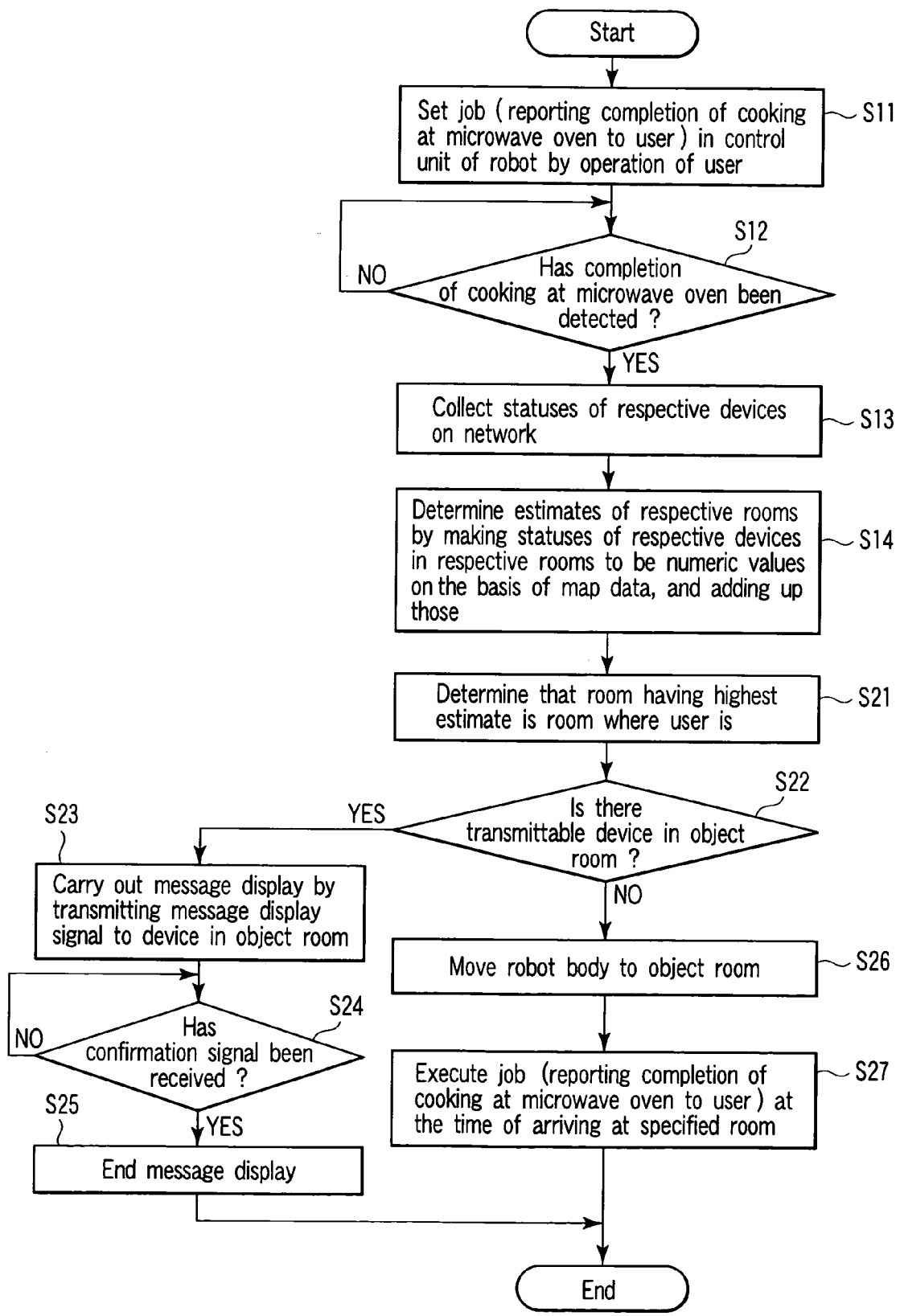
FIG. 13 is a flowchart showing another example of user position estimation processing of the mobile information apparatus.

A fourth embodiment further specifies the method for confirming that the user has identified the information presented from a television in the mobile information apparatus of the third embodiment. FIG. 13 is a flowchart showing another example of the user position estimation processing of the mobile information apparatus.

Namely, as shown in FIG. 8, a confirming function is provided to a specific button (which may be simply a cancel key) on a remote controller R attached to the digital television 107. As a result, as shown in the flowchart of FIG. 13, when a message display signal is transmitted to a television in a corresponding room, and a message is displayed on the television (S23), the user sees the message displayed on the television, and pushes a response button on the remote controller as a response thereto. The television receives the signal, and transmits it to the control unit (not shown) of the server S or the control unit 10 of the robot 1 via the network (S24). In contrast thereto, the control unit 10 determines that the information is exactly reported to the user, and completes the message display by instructing the television to delete the message display (S25). Or, these determinations may be carried out at the side of the digital television 107. In this way, by further providing a confirming function from a user, it is possible to report the information to the user. Note that, when there is no device which is transmittable (S22), the robot 1 moves to the corresponding room (S26), and when the robot 1 arrives at the room, the robot 1 directly makes a report to the user.

Fifth Embodiment: Estimation of Individual in accordance with Program Type

Figure 9:
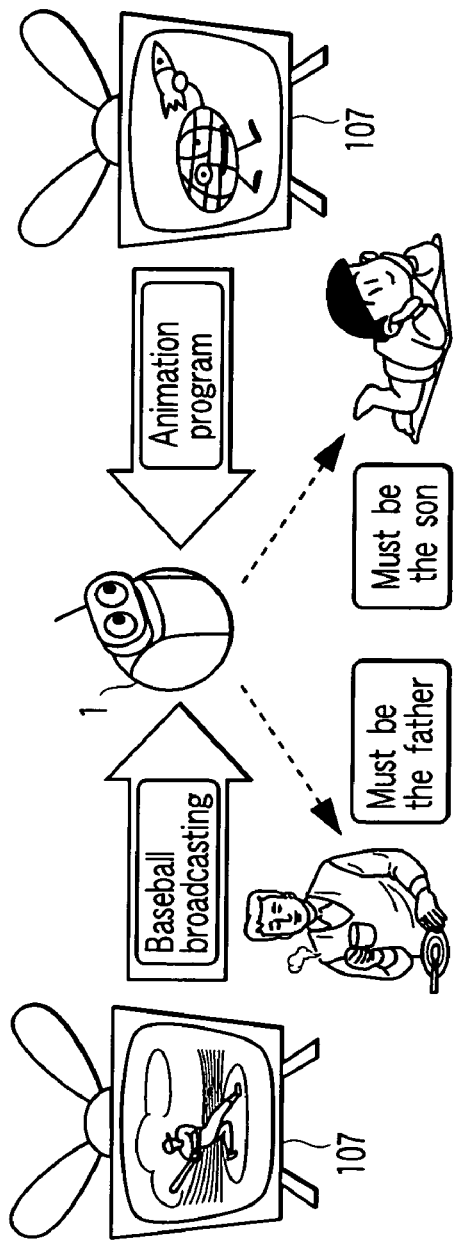
FIG. 9 is an explanatory diagram showing another example of indoor user position estimation processing by the mobile information apparatus according to the embodiment of the invention.

A fifth embodiment shows an effect that a broadcast content which a tuner is receiving is detected, and an individual user is specified in accordance with the received broadcast content in the above-described mobile information apparatus. FIG. 9 is an explanatory diagram showing another example of indoor user position estimate processing by the mobile information apparatus according to the embodiment of the invention.

In the mobile information apparatus 1 according to the invention, a plurality of users have been registered in advance in association with types of broadcast programs in the estimation function of the control unit 10 (or the control unit of the server S). Then, it is determined that there is a high possibility that a specific user among the plurality of users is viewing the program in accordance with a type of a broadcast program received by a tuner device of a television or the like on the network.

For example, as shown in FIG. 9, a father and a baseball program, and a son and an animation program are respectively set in advance so as to be associated with each other. Then, on the basis of electronic program guidance (EPG) information or the like, a type of a program while an individual is viewing is received at the control unit 10 via the network, and it is determined that the individual is the father on the basis of the type of the program while the individual is viewing. By using such a technique, it is specified who a user in the room is, it is possible to estimate a position of the user to which the information must be reported.

Sixth Embodiment: Evaluation of State Signals

Figure 10:
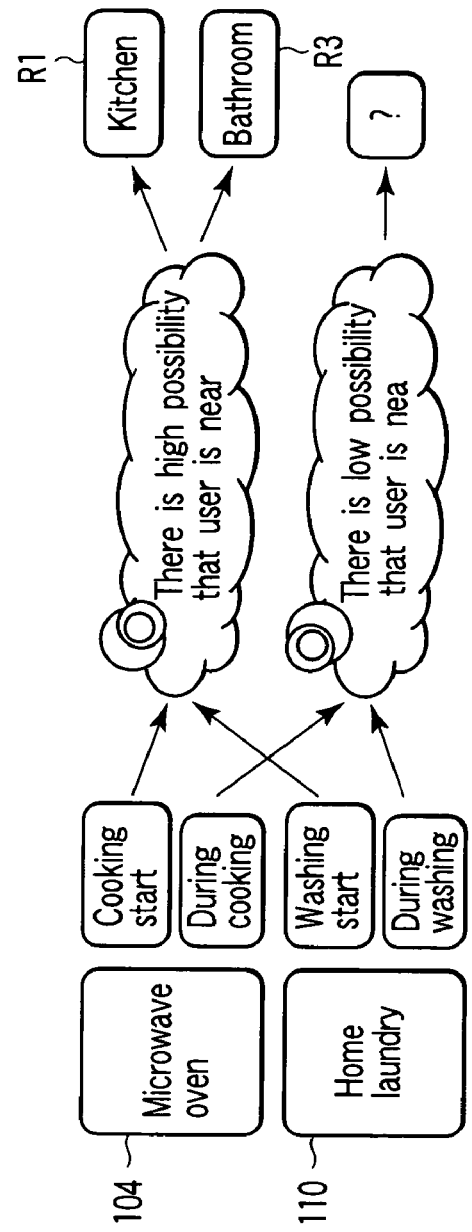
FIG. 10 is an explanatory diagram showing another example of indoor user position estimation processing by the mobile information apparatus according to the embodiment of the invention.

A sixth embodiment specifies that a user position is estimated by varying evaluations in accordance with the state signals from the devices in the above-described mobile information apparatus. FIG. 10 is an explanatory diagram showing another example of indoor user position estimation processing of the mobile information apparatus according to the embodiment of the invention.

Namely, this shows that, in the user position estimation processing of the control unit 10 of the mobile information apparatus 1, an evaluation at the time of turning a start switch of a device on is calculated so as to be evaluated more than an evaluation of the device in operation. Namely, the fact that a start switch of a device is turned on is based on that there is an extremely high possibility that a user is in the room at the present time, and has just turned the switch on. In this way, a user can arbitrarily set in advance an evaluation value in accordance with each usage state of each device information.

In a case of the microwave oven 104, as shown in FIG. 10, a state signal denoting that a cooking start button has been pushed is information catching that a user has directly operated the device, and is defined as an operational event. On the other hand, a state denoting during cooking is information catching that the operation is continued after starting the cooking, and is defined as a continuous event. The same definition can be achieved in a case of the washing machine 110 or the like. In addition thereto, with respect to a television, a signal denoting that a channel has been switched, a signal denoting that a volume has been operated, and the like can be defined as operational signals.

Because, in a case of an operational event, the event is immediately after a device is directly operated, it can be estimated that there is a high possibility that a user is near to a device which is an object, and therefore, a value at the time of calculation is preferably set to a high value. On the other hand, in a case of a continuous event, the event merely expresses an operating state of the device. Consequently, there is a low possibility that a user is near to the device, and therefore, a value at the time of calculation is preferably set to a low value. On the basis of the estimated result, a position of the user can be estimated.

As described above in detail, in accordance with the control unit 10 of the mobile information apparatus or the position estimation function of the server S according to the invention, a search of a position of a user can be easily carried out when the self-propelled robot 1 presents information to the user by using the user position estimation which uses network devices. Moreover, because the robot 1 moves to a position of a user, and reports the information to the user after identifying an individual, the information can be exactly reported from the robot 1 to the user.

Accordingly, even when the user is in a place away from a position of a device, the user can know the operating state of the device, and a time in which the user periodically goes for a confirmation to the place of the device which is an object can be saved. Things which the user in a place away from the device does not notice, such as a sudden failure of the device, can be known via the network.

Furthermore, by using a user interface function by the robot 1, or by using a response function by a message display on a television and a remote controller, information can be exactly reported to the user.

Namely, in accordance with the embodiments of the invention described above, by using a usage state of an existing network device, a position where a user is in is estimated without installing a new sensor or the like, and a service of transmitting information is provided. Thereafter, the mobile information apparatus which is a self-propelled robot is used for transmitting a message, and the robot moves to an estimated place where the user is in, and the message is reported to the user by using a user interface function (a display or a speaker) which the robot has.

Here, the mobile information apparatus which is a self-propelled robot acquires the usage states of the devices on the network, i.e., the usage states that, for example, a television is in process of starting, or moreover, a channel has been changed just now, and the like, via a wireless (or a wire) network such as Bluetooth, wireless LAN, IEEE 1394, or the like. Moreover, a possibility of user presence in each room is calculated in accordance with the map data of the rooms which have been prepared in advance and the layout of the respective devices in the respective rooms, and the like, and a room having the highest possibility is estimated.

Accordingly, because a place where the user is in, which cannot be known by image processing by the camera installed in the mobile robot, can be efficiently identified, a practical mobile information apparatus which is a self-propelled robot can be provided.

In accordance with the various embodiments described above, the skilled in the art can realize the invention. However, it is easy for those skilled in the art to further conceive of various modified examples of these embodiments, and the invention can be applied to various embodiments without inventive ability. Accordingly, the invention extends over a broad range which does not contradict the disclosed principles and the novel features, and is not limited to the embodiments described above.

What is claimed is:

1. A mobile information apparatus comprising:
    a communication unit configured to collect usage states of a plurality of devices on a network;
    an estimation unit configured to estimate a position of a user on the basis of the usage states of said plurality of devices collected by the communication unit; and
    a moving unit configured to move a housing of the mobile information apparatus in accordance with the position of the user estimated by the estimation unit.

2. The mobile information apparatus according to claim 1, wherein the communication unit includes a first communication unit included in a server connected to said plurality of devices via the network, and a second communication configured to make communication with the first communication unit, the second communication being provided at the housing of the mobile information apparatus.

3. The mobile information apparatus according to claim 1, wherein the estimation unit has map data denoting that said plurality of devices are provided at a plurality of respective rooms, determines a possibility of the presence of the user on the basis of the usage states of said plurality of devices collected by the communication unit, determines a possibility of user presence at each of said plurality of rooms, and estimates that the user is in a room having the highest possibility of user presence.

4. The mobile information apparatus according to claim 3, wherein the estimation unit makes a possibility of user presence to be a numeric value for each of said plurality of devices, makes a possibility of user presence to be a numeric value at each of said plurality of rooms by using the map data in accordance with the numeric value, and estimates that the user is in a room having the highest numeric value.

5. The mobile information apparatus according to claim 3, wherein the estimation unit stores a plurality of room information as the map data, device information corresponding to the room information, and evaluation information as numeric values denoting the possibilities of user presence corresponding to the respective usage states of the device information, and makes a possibility of user presence to be a numeric value at each room on the basis of those information.

6. The mobile information apparatus according to claim 5, wherein the evaluation information of the estimation unit are calculated such that an evaluation at the time of turning a start switch of the device on is made higher than an evaluation of the device in operation.

7. The mobile information apparatus according to claim 1, wherein the estimation unit registers a plurality of users in association with types of broadcast programs, determines that there is a high possibility that a specific user among said plurality of users is viewing the program in accordance with a type of a broadcast program received by a tuner device on the network, and estimates a position of the user on the basis of the determination.

8. The mobile information apparatus according to claim 1, further comprising:
a display unit configured to display predetermined information after the moving unit moves the housing of the mobile information apparatus to a room estimated such that the user is in.

9. The mobile information apparatus according to claim 1, further comprising:
a control unit configured to control to display predetermined information on the device by transmitting a predetermined signal to the device which is in the vicinity of the position of the user estimated by the estimation unit, via the network by using the communication unit.

10. An information system comprising:
a communication unit configured to collect usage states of a plurality of devices on a network; and
an estimation unit configured to estimate a position of a user on the basis of the usage states of said plurality of devices collected by the communication unit.

11. A moving method for a mobile information apparatus, comprising:
collecting usage states of a plurality of devices on a network;
estimating a position of a user on the basis of the collected usage states of said plurality of devices; and
moving a housing of the mobile information apparatus in accordance with the estimated position of the user.

12. The moving method according to claim 11, wherein communication carried out in the collecting is carried out by a first communication unit included in a server connected to said plurality of devices via the network, and a second communication unit provided at the housing of the mobile information apparatus configured to carry out communication with the first communication unit.

13. The moving method according to claim 11, wherein a possibility of user presence at each of said plurality of rooms is determined by using map data denoting that said plurality of devices are provided at a plurality of respective rooms on the basis of the collected usage states of said plurality of devices, and it is estimated that the user is in a room having the highest possibility of user presence.

14. The moving method according to claim 13, wherein a possibility of user presence is made to be a numeric value for each of said plurality of devices, a possibility of user presence is made to be a numeric value at each of said plurality of rooms by using the map data in accordance with the numeric value, and it is estimated that the user is in a room having the highest numeric value.

15. The moving method according to claim 13, wherein a plurality of room information as the map data, device information corresponding to the room information, and evaluation information as numeric values denoting the possibilities of user presence corresponding to the respective usage states of the device information are stored, and a possibility of user presence is made to be a numeric value at each room on the basis of those information.

16. The moving method according to claim 15, wherein the evaluation information are calculated such that an evaluation at the time of turning a start switch of the device on is made higher than an evaluation of the device in operation.

17. The moving method according to claim 11, wherein a plurality of users are registered in association with types of broadcast programs, it is determined that there is a high possibility that a specific user among said plurality of users is viewing the program in accordance with a type of a broadcast program received by a tuner device on the network, and a position of the user is estimated on the basis of the determination.

18. The moving method according to claim 11, wherein predetermined information is displayed after moving the housing of the mobile information apparatus to a room estimated such that the user is in.

19. The moving method according to claim 11, wherein control is achieved so as to display predetermined information on the device by transmitting a predetermined signal via the network to the device which is in the vicinity of the estimated position of the user.

20. A method of determining a position of an information system, comprising:
collecting usage states of a plurality of devices on a network via the network; and
estimating a position of a user on the basis of the collected usage states of said plurality of devices.

* * * * *